(12) United States Patent
Miyazaki

(10) Patent No.: US 11,796,884 B2
(45) Date of Patent: Oct. 24, 2023

(54) ELECTROCHROMIC ELEMENT

(71) Applicant: CANON KABUSHIKI KAISHA, Tokyo (JP)

(72) Inventor: Kazuya Miyazaki, Kunitachi (JP)

(73) Assignee: Canon Kabushiki Kaisha, Tokyo (JP)

(*) Notice: Subject to any disclaimer, the term of this patent is extended or adjusted under 35 U.S.C. 154(b) by 795 days.

(21) Appl. No.: 16/811,370

(22) Filed: Mar. 6, 2020

(65) Prior Publication Data

US 2020/0292906 A1  Sep. 17, 2020

(30) Foreign Application Priority Data

Mar. 15, 2019 (JP) .................................. 2019-048245

(51) Int. Cl.
*G02F 1/15* (2019.01)
*G02B 26/00* (2006.01)
(Continued)

(52) U.S. Cl.
CPC .............. *G02F 1/163* (2013.01); *G02F 1/155* (2013.01); *G02F 1/1533* (2013.01); *G02F 2001/1552* (2013.01)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS 4,178,077 A * 12/1979 Te Velde .................. G09F 9/372
359/223.1
4,374,610 A *  2/1983 Kuwagaki ............. G02F 1/1533
359/267
(Continued)

FOREIGN PATENT DOCUMENTS

JP       2017-187684 A       10/2017
JP       2018159727 A  *    10/2018   ........... E06B 3/6722

*Primary Examiner* — Dawayne Pinkney
(74) *Attorney, Agent, or Firm* — Venable LLP

(57) ABSTRACT

According to an electrochromic element of the present disclosure, when maximum and minimum optical densities in a coloring region face when an inter-electrode distance is constant are $\Delta OD_{max}$ and $\Delta OD_{min}$, respectively, the electrodes distance $d'=d+\delta d$ (d: an inter-electrode distance when the inter-electrode distance of a pair of electrodes is constant, $\delta d$: an inter-electrode distance correction amount) at a position providing $\Delta OD_{min}$, and when an optimal inter-electrode distance correction amount $\Delta d_0$ calculated when an optical density difference between $\Delta OD_{max}$ and $\Delta OD_{min}$ is completely eliminated at the position providing $\Delta OD_{min}$ is defined as equation: $\delta d_0 (\Delta OD)=d\times(\Delta OD_{max}/\Delta OD_{min}-1)$, $\delta d$ at a position providing $\Delta OD_{min}$ is smaller than or equal to the maximum value $\delta d_{0,\ MAX}$ of $\delta d_0$ ($0<\Delta OD<D$) at $0<\Delta OD<D$ and larger than or equal to $\delta d_0$ ($\Delta OD=D$) at $\Delta OD=D$.

10 Claims, 14 Drawing Sheets

(51) Int. Cl.
*G02F 1/1503* (2019.01)
*G09G 3/19* (2006.01)
*F21V 14/00* (2018.01)
*G02F 1/163* (2006.01)
*G02F 1/153* (2006.01)
*G02F 1/155* (2006.01)

(58) Field of Classification Search
USPC ............... 359/265–275, 277, 245–247, 242; 345/49, 105; 250/70; 348/814, 817; 438/929; 349/182–186
See application file for complete search history.

(56) References Cited

U.S. PATENT DOCUMENTS

| | | |
|---|---|---|
| 10,539,852 B2 | 1/2020 | Miyazaki |
| 2017/0293193 A1 | 10/2017 | Miyazaki |
| 2018/0275477 A1* | 9/2018 | Miyazaki ................ G02F 1/163 |

* cited by examiner

ELECTROCHROMIC ELEMENT

BACKGROUND OF THE INVENTION

Field of the Invention

The present disclosure relates to an electrochromic element.

Description of the Related Art

An electrochromic (hereinafter, which may be referred to as "EC") element is an element having a pair of electrodes and an EC layer arranged between the electrodes. Further, the EC element is an optical element that adjusts a color phase or a light amount in a visible light region by applying a voltage between the pair of electrodes to oxidize or reduce a compound in an EC layer. In recent years, there is an increasing demand for a moving-image capturing device using an image pickup device on which a variable ND filter capable of adjusting the optical density in a stepless manner is mounted. Since an EC element using an organic EC material has a wide range of light amount adjustment and design of spectral transmittance thereof is relatively easy, the EC element is a promising candidate for a variable ND filter mounted on a moving-image capturing device. On the other hand, a so-called solution-type EC element configured such that a solution in which an organic EC material is dissolved in a solvent is arranged between a pair of electrodes generates an inhomogeneous potential distribution in an electrode face because of a relatively large current flow, which may cause inhomogeneity of transmittance in a coloring region face. Japanese Patent Application Laid-Open No. 2017-187684 discloses a technique in which current is limited by adding a cyanoethylated polymer as a thickening agent to an EC layer.

As a scheme for directly improving an inhomogeneous potential distribution that is a cause of inhomogeneity of transmittance, two methods, namely, decreasing the electrode resistance and reducing the element current are considered. However, when the former is performed, for example, when an electrode resistance is reduced due to a thickened film of a transparent electrode, light absorption at the electrode part increases, and transmittance of the whole element is reduced. Further, when the latter is performed, when a current is limited by adding a thickening agent as with the case of Japanese Patent Application Laid-Open No. 2017-187684, material transfer is inhibited, and the response speed of the element is delayed. As described above, it is difficult to obtain a sufficient effect without compromising a basic performance of an EC element such as transmittance or response performance by using the traditional methodology of reducing inhomogeneity of transmittance by improving an inhomogeneous potential distribution.

SUMMARY OF THE INVENTION

The present invention has been made in view of the above problems and intends to provide an EC element in which inhomogeneity of transmittance is reduced by control of an optical path length in an element sectional direction.

An electrochromic element of the present disclosure includes: a pair of electrodes; and an electrochromic layer arranged between the pair of electrodes, the electrochromic element has a modulation range of an optical density $\Delta OD$ that is $0 \le \Delta OD \le D$, and when a maximum optical density and a minimum optical density in a coloring region face when an inter-electrode distance of the pair of electrodes is constant are $\Delta OD_{max}$ and $\Delta OD_{min}$, respectively, an inter-electrode distance d' of the pair of electrodes is represented by a following equation at a position providing the minimum optical density $\Delta OD_{min}$:

$$d' = d + \delta d$$

d: an inter-electrode distance when the inter-electrode distance of the pair of electrodes is constant δd: an inter-electrode distance correction amount, and when an optimal inter-electrode distance correction amount $\delta d_0$ calculated when an optical density difference between the maximum optical density $\Delta OD_{max}$ and the minimum optical density $\Delta OD_{min}$ is completely eliminated at the position providing the minimum optical density $\Delta OD_{min}$ is defined as a following equation:

$$\delta d_0(\Delta OD) = d \times (\Delta OD_{max}/\Delta OD_{min} - 1),$$

the inter-electrode distance correction amount δd at the position providing the minimum optical density $\Delta OD_{min}$ is smaller than or equal to a maximum value $\delta d_{0,\,MAX}$ of the optimal inter-electrode distance correction amount $\delta d_0$ (0<$\Delta OD$<D) at 0<$\Delta OD$<D and larger than or equal to the optimal inter-electrode distance correction amount $\delta d_0$ ($\Delta OD=D$) at $\Delta OD=D$.

Further features of the present invention will become apparent from the following description of exemplary embodiments with reference to the attached drawings.

DESCRIPTION OF THE EMBODIMENTS

1. Electrochromic Element (EC Element)

The preferable embodiments for the configuration of the EC element according to the present disclosure will be illustratively described below in detail with reference to the drawings. Note that a configuration, relative arrangement, and the like described in the embodiment do not limit the scope of the present invention unless otherwise specified.

Figure 1A:
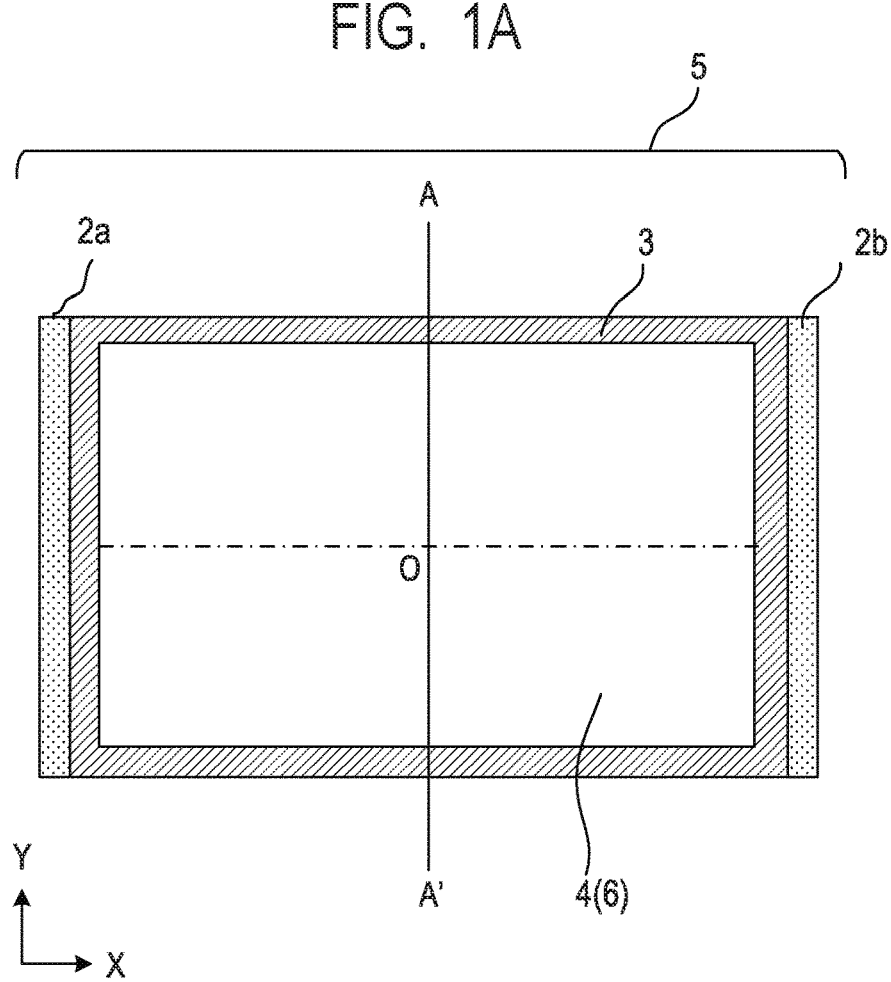
FIG. 1A is a schematic plan view illustrating one embodiment of an EC element according to the present invention.
Figure 1B:
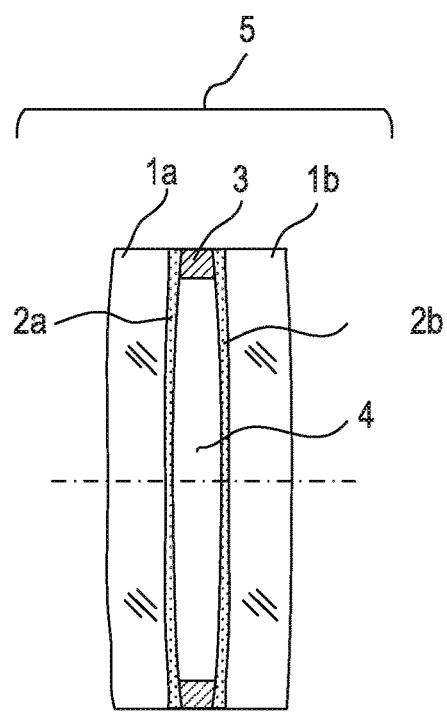
FIG. 1B is a schematic sectional view illustrating one embodiment of the EC element according to the present invention.

First, the configuration of the EC element of the present disclosure will be briefly described with reference to FIG. 1A and FIG. 1B. FIG. 1A is a schematic plan view illustrating one embodiment of an EC element 5 of the present disclosure. FIG. 1B is a schematic sectional view of the EC element 5 taken along a line A-A' passing through the element center O of FIG. 1A. In FIG. 1A and FIG. 1B, the EC element 5 is forme of a glass substrate as a pair of substrates 1a and 1b on which transparent electrodes are formed as a pair of electrodes 2a and 2b, respectively, and an EC layer 4 arranged in a space defined by the pair of electrodes 2a and 2b and a seal 3. As illustrated in FIG. 1A, a region surrounded by the seal 3 is a coloring region 6, and the element center O is the center of the coloring region 6 in FIG. 1A.

An inter-electrode distance of the pair of electrodes 2a and 2b of the EC element 5 of the present disclosure is characterized by being determined based on an optical density distribution when the inter-electrode distance is constant. The EC element 5 in FIG. 1A and FIG. 1B is configured such that the inter-electrode distance at the element center is the largest. As long as the electrode arrangement and the power supply configuration that are symmetrical with respect to the element center are employed, the element center has always the highest transmittance, and the transmittance distribution can be corrected and improved by maximizing the inter-electrode distance at the element center.

More specifically, an inter-electrode distance d' of the pair of electrodes 2a and 2b of the EC element 5 of the present invention is represented by the following equation (a) at the position providing the minimum optical density $\Delta OD_{min}$. Herein, the minimum optical density $\Delta OD_{min}$ is the minimum optical density in the coloring region face when the inter-electrode distance of the pair of electrodes 2a and 2b is constant.

$$d'=d+\delta d \qquad (a)$$

d: an inter-electrode distance when the inter-electrode distance of the pair of electrodes 2a and 2b is constant δd: an inter-electrode distance correction amount Control of the inter-electrode distance can be preferably realized by weight control or the like when the pair of substrates 1a and 1b are attached to each other.

Figure 2A:
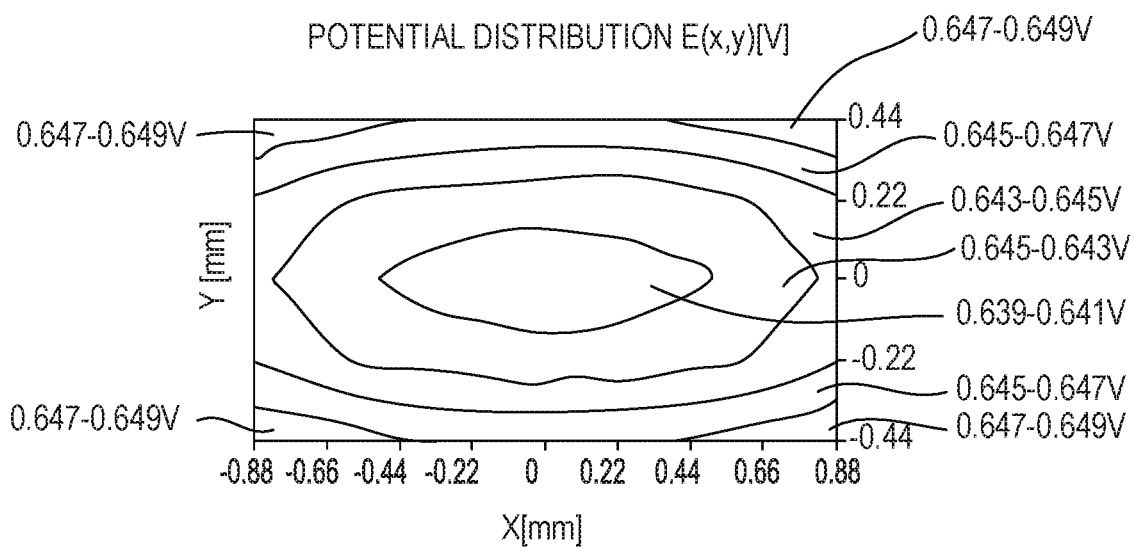
FIG. 2A is a graph illustrating a potential distribution in an element when an inter-electrode distance is constant.
Figure 2B:
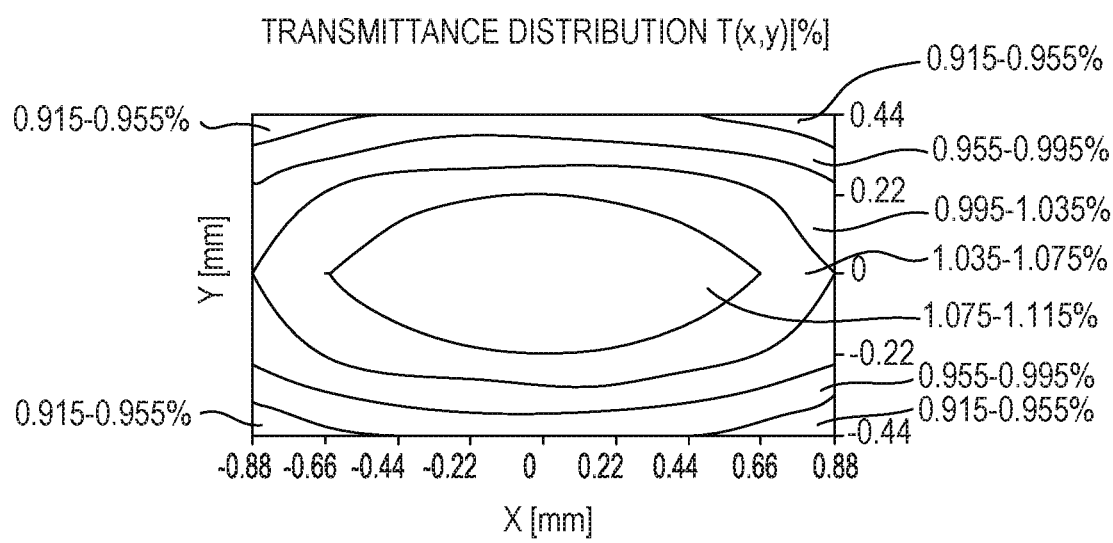
FIG. 2B is a graph illustrating transmittance distribution in the element when an inter-electrode distance is constant.

FIG. 2A and FIG. 2B are graphs illustrating a potential distribution E (x, y) and a transmittance distribution T (x, y) in an element in which the inter-electrode distance of the pair of electrodes 2a and 2b is constant in a coloring region face when colored to the optical density ΔOD=2.0 by applying an external voltage of 0.661 V. The coloring region face is a rectangle in FIG. 2A and FIG. 2B but may be another shape such as a circle. As illustrated in FIG. 2A, the potential is the maximum value of 0.649 V at the four corners of the coloring region face and is the minimum value of 0.640 V at the center of the coloring region face. On the other hand, as illustrated in FIG. 2B, the transmittance is the minimum value of 0.92% at the four corners of the coloring region face in which the potential is the largest and is the maximum value of 1.12% at the element center in which the potential is the smallest. The transmittance variation at this time is around ±10% in the plane and is a significantly large value for a use in a variable ND filter.

Herein, the inhomogeneity of transmittance due to a potential distribution can be completely canceled by using Lambert-Beer law in which the optical density (the logarithmic value of the transmittance) is proportional to an optical path length so that an inter-electrode distance d' (x, y) at a position (x, y) satisfies the following equation (b), $$d'(x, y)=d\times(\Delta OD_{max}/\Delta OD(x, y)) \qquad (b)$$

d: an inter-electrode distance when the inter-electrode distance of the pair of electrodes 2a and 2b is constant ΔOD (x, y): an optical density at a position (x, y) when the inter-electrode distance is constant $\Delta OD_{max}$: the maximum optical density in the coloring region face when the inter-electrode distance is constant (the optical density at the four corners in the coloring region face in FIG. 2A and FIG. 2B).

Figure 3A:
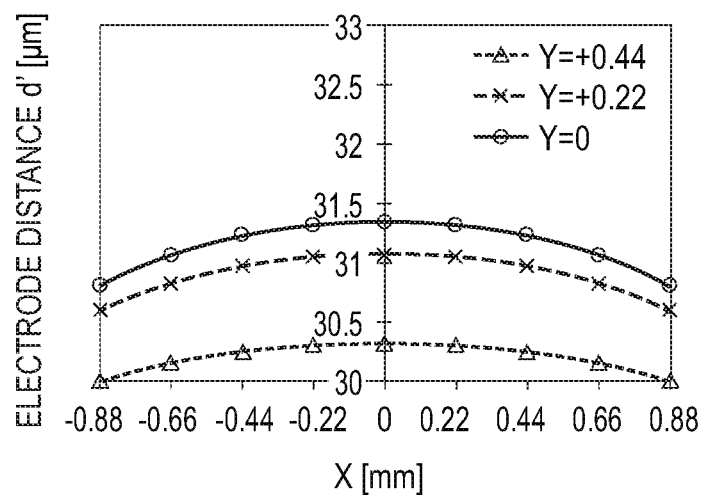
FIG. 3A is a graph illustrating an inter-electrode distance (X-axis reference) determined using FIG. 2A and FIG. 2B.
Figure 3B:
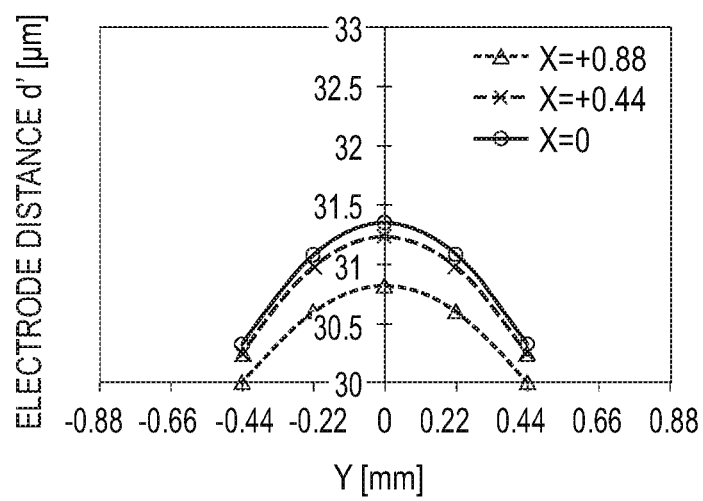
FIG. 3B is a graph illustrating an inter-electrode distance (Y-axis reference) determined using FIG. 2A and FIG. 2B.

FIG. 3A and FIG. 3B are graphs illustrating a new inter-electrode distance d' (x, y) that can cancel the inhomogeneity of transmittance determined by applying the relationship illustrated in FIG. 2A and FIG. 2B. FIG. 3A is a graph based on the X-axis direction as a reference, and FIG. 3B is a graph based on the Y-axis direction as a reference. It is indicated that convex shape correction of 1.35 µm at the maximum is required at the element center for an inter-electrode distance d=30 µm when the inter-electrode distance is constant. Further, the new inter-electrode distance d' (x, y) that can cancel the inhomogeneity of transmittance is the same quadratic curve as a catenary with fixed both ends. Accordingly, it is also indicated that, when the inter-electrode distance is corrected by only focusing on the position providing the maximum transmittance/the position providing the minimum optical density $\Delta OD_{min}$ (the element center in FIG. 2A and FIG. 2B), the inter-electrode distance can cancel inhomogeneity of transmittance over the whole coloring region can be formed.

Figure 4A:
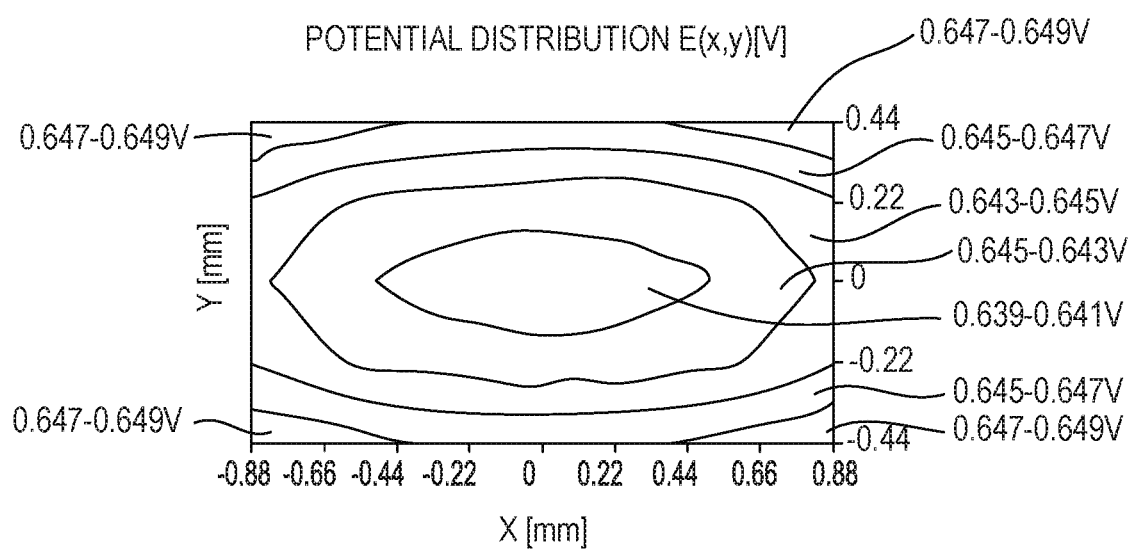
FIG. 4A is a graph illustrating a potential distribution in an element of a inter-electrode distance d' (x, y).
Figure 4B:
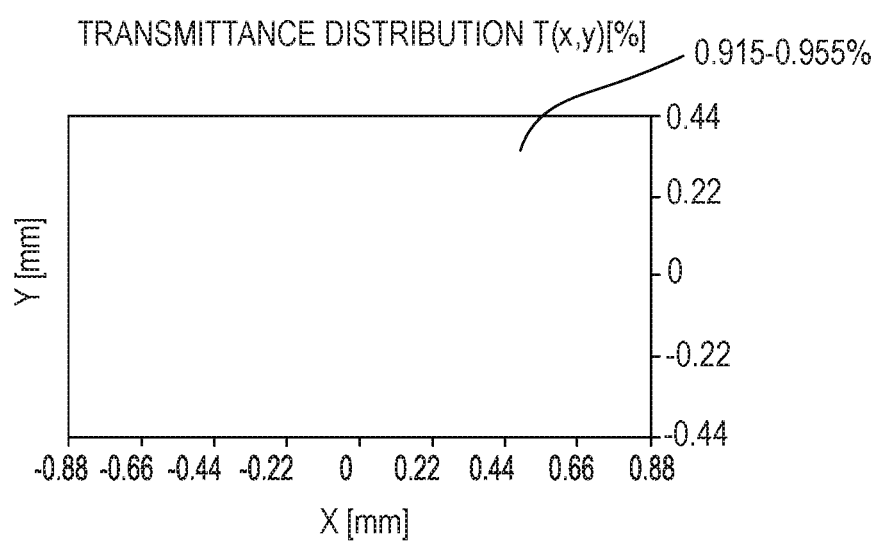
FIG. 4B is a graph illustrating a transmittance distribution in an element of an inter-electrode distance d' (x, y).

FIG. 4A and FIG. 4B are graphs illustrating a potential distribution E (x, y) and a transmittance distribution T (x, y) in the coloring region face at the time of coloring in the same condition as in FIG. 2A and FIG. 2B in the element of the new inter-electrode distance d' (x, y) illustrated in FIG. 3A and FIG. 3B in which the element center has a convex shape. As illustrated in FIG. 4A, the potential distribution is not changed at all from FIG. 2A. On the other hand, as illustrated in FIG. 4B, it can be seen that the transmittance is 0.92% over the whole region, and the inhomogeneity of transmittance is eliminated at the minimum value.

As described above, by newly determining the inter-electrode distance d' (x, y) based on the optical density distribution of the EC element whose inter-electrode distance is constant, the inhomogeneity of transmittance can be reduced.

Figure 5:
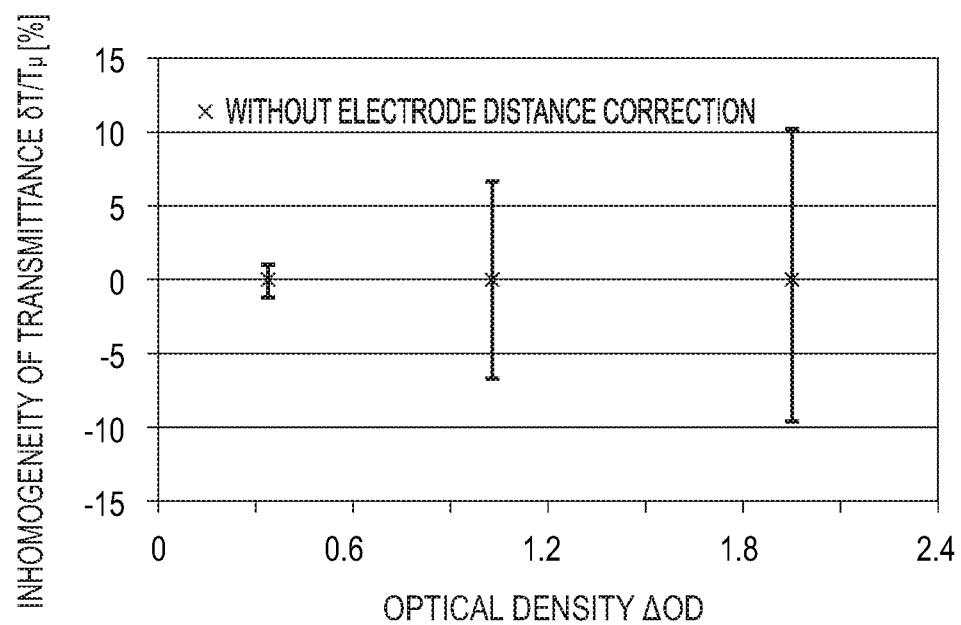
FIG. 5 is a graph illustrating dependency of the number of optical steps of inhomogeneity of transmittance in an element in which an inter-electrode distance is constant.

Next, FIG. 5 illustrates dependency of the number of optical steps of the inhomogeneity of transmittance (modulation range of the optical density $\Delta OD$: $0 \leq \Delta OD \leq 2.0$) at the position providing the minimum optical density $\Delta OD_{min}$ in the element that has a constant inter-electrode distance and is not corrected. Since the current that flows into the element increases as the number of optical stages increases, it can be seen that the inhomogeneity of transmittance also increases due to a voltage drop. The inhomogeneity of transmittance at the optical density $\Delta OD=2.0$ is +10.3%/−9.5%, which corresponds to around 0.3 steps of exposure difference and thus is large value for a use in a variable ND filter of an imaging device. Further, the fact that the inhomogeneity of transmittance significantly changes depending on the optical density means that the brightness of the acquired image changes in a use for a variable ND filter of an imaging device. Thus, it is also necessary to suppress optical density dependency of inhomogeneity of transmittance to a range that does not affect an image.

Figure 6A:
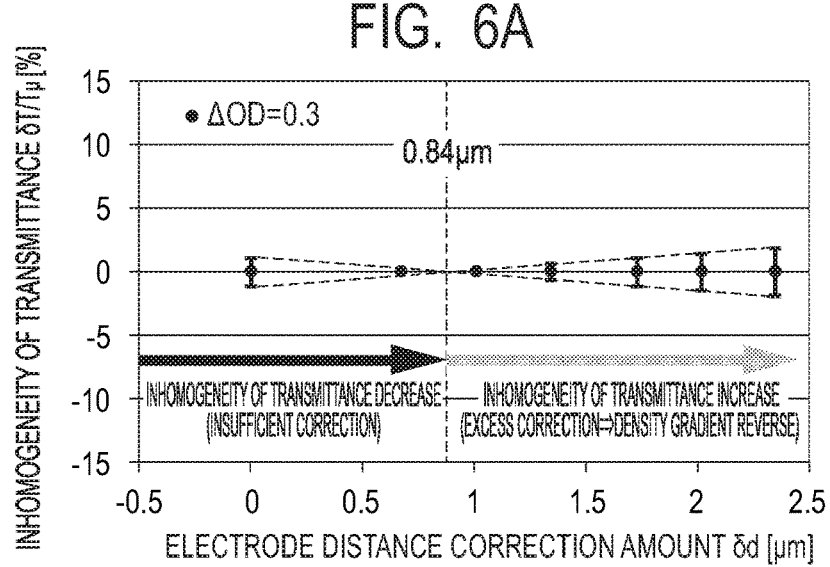
FIG. 6A is a graph illustrating inhomogeneity of transmittance when correction of an inter-electrode distance is performed at the time of coloring at an optical density of 0.3.
Figure 6B:
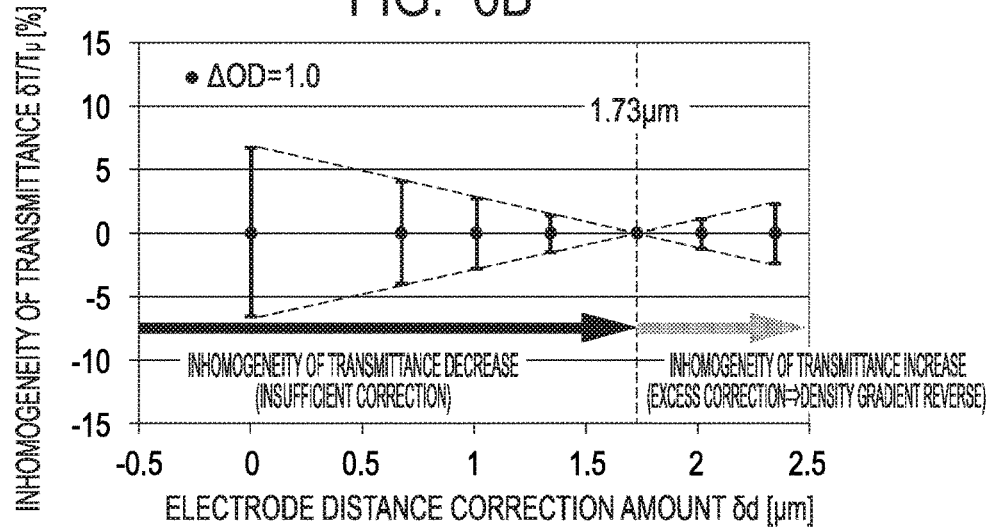
FIG. 6B is a graph illustrating inhomogeneity of transmittance when correction of an inter-electrode distance is performed at the time of coloring at an optical density of 1.0.
Figure 6C:
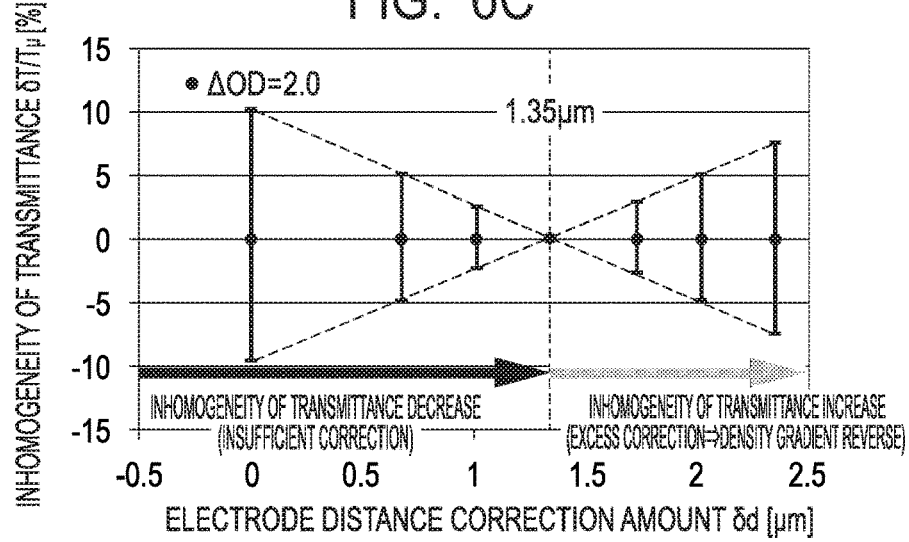
FIG. 6C is a graph illustrating inhomogeneity of transmittance when correction of an inter-electrode distance is performed at the time of coloring at an optical density of 2.0.

On the other hand, FIG. 6A, FIG. 6B, and FIG. 6C illustrate change of the inhomogeneity of transmittance at the time of coloring at the optical density $\Delta OD=0.3$, 1.0, and 2.0, respectively, when the inter-electrode distance is corrected. The inter-electrode distance correction amount $\delta d$ of FIG. 6A, FIG. 6B, and FIG. 6C represents a difference between an inter-electrode distance of the position providing the maximum optical density $\Delta OD_{max}$/the position providing the minimum transmittance (four corners of the coloring region face in FIG. 2A and FIG. 2B) and an inter-electrode distance of the position providing the minimum optical density $\Delta OD_{min}$/the position providing maximum transmittance (the element center in FIG. 2A and FIG. 2B). That is, the inter-electrode distance correction amount $\delta d$ of FIG. 6A, FIG. 6B, and FIG. 6C is an inter-electrode distance correction amount at the position providing the minimum optical density $\Delta OD_{min}$ and is defined by the following equation (c).

$$\delta d = d \times (\Delta OD_{max}/\Delta OD_{min}) - d \times (\Delta OD_{max}/\Delta OD_{min}) = d \times (\Delta OD_{max}/\Delta OD_{min} - 1) \quad (c)$$

d: an inter-electrode distance when the inter-electrode distance of the pair of electrodes 2a and 2b is constant
$\Delta OD_{max}$: the maximum optical density in the coloring region face when the inter-electrode distance is constant
$\Delta OD_{min}$: the minimum optical density in the coloring region face when the inter-electrode distance is constant From FIG. 6A illustrating the relationship between the inter-electrode distance correction amount and the inhomogeneity of transmittance at the time of coloring at $\Delta OD=0.3$, first, the inhomogeneity of transmittance when no correction is performed ($\delta d=0$) is +1.1%/−1.1%. The inhomogeneity of transmittance then gradually decreases as the inter-electrode distance correction amount increases from $\delta d=0$, and the inhomogeneity of transmittance becomes zero at the inter-electrode distance correction amount $\delta d=0.84$ μm. The inter-electrode distance correction amount $\delta d$, that is, the inter-electrode distance correction amount $\delta d$ calculated when the difference of an optical density between the maximum optical density $\Delta OD_{max}$ and minimum optical density $\Delta OD_{min}$ is completely eliminated is the optimal inter-electrode distance correction amount $\delta d_0$ at the time of coloring at $\Delta OD=0.3$ and is represented by the following equation (d).

$$\delta d_0(\Delta OD=0.3) = d \times (\Delta OD_{max}/\Delta OD_{min} - 1) \quad (d)$$

d: an inter-electrode distance when the inter-electrode distance of the pair of electrodes 2a and 2b is constant
$\Delta OD_{max}$: the maximum optical density in the coloring region face when the inter-electrode distance is constant
$\Delta OD_{min}$: the minimum optical density in the coloring region face when the inter-electrode distance is constant The inhomogeneity of transmittance gradually increases as the inter-electrode distance correction amount further increases from the optimal inter-electrode distance correction amount $\delta d_0$, and the density gradient for the position is reversed. That is, the transmittance on the element center is lower than the transmittance on the four corners of the coloring region face in FIG. 2A and FIG. 2B.

Similarly, as illustrated in FIG. 6B, at the time of coloring at $\Delta OD=1.0$, the inhomogeneity of transmittance when no correction is performed ($\delta d=0$) is +6.7%/−6.6%. The inhomogeneity of transmittance then gradually decreases as the inter-electrode distance correction amount increases from $\delta d=0$, and the inhomogeneity of transmittance becomes zero at the inter-electrode distance correction amount $\delta d=1.73$ μm. That is, the optimal inter-electrode distance correction amount $\delta d_0=1.73$ μm. Moreover, as illustrated in FIG. 6C, at the time of coloring at $\Delta OD=2.0$, the inhomogeneity of transmittance when no correction is performed ($\delta d=0$) is +10.3%/−9.5%. The inhomogeneity of transmittance then gradually decreases as the inter-electrode distance correction amount increases from $\delta d=0$, and the inhomogeneity of transmittance becomes zero at the inter-electrode distance correction amount $\delta d=1.35$ μm. That is, the optimal inter-electrode distance correction amount $\delta d_0=1.35$ μm.

In such a way, due to the non-linearity of the current-voltage property and the voltage-optical density property of the element, since the optimal inter-electrode distance correction amount $\delta d_0$ at which the inhomogeneity of transmittance becomes zero due to the optical density $\Delta OD$ is different, various correction specifications can be considered in accordance with how to use the element.

Figure 7:
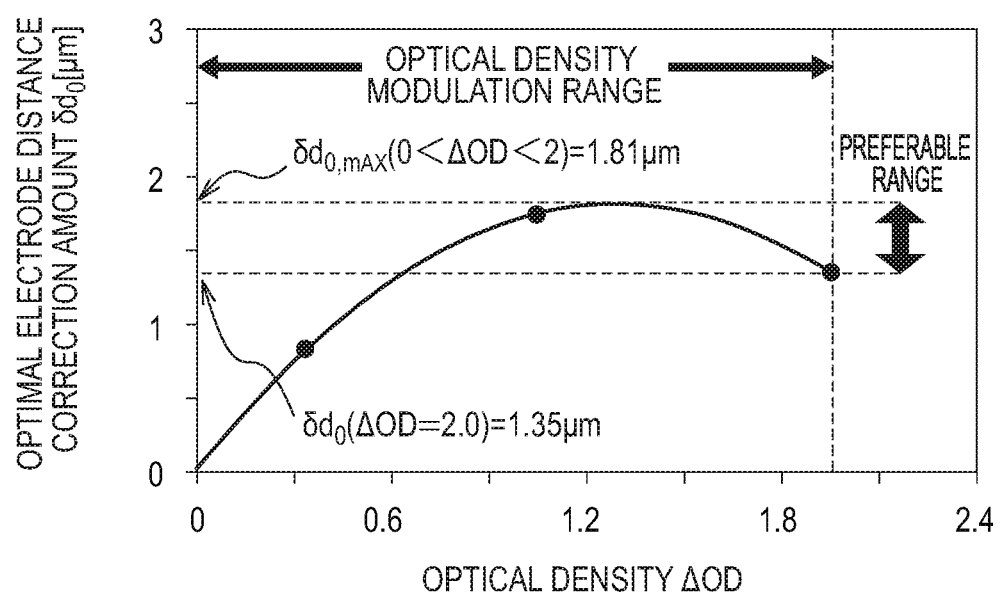
FIG. 7 is a graph illustrating a relationship between an optical density and an optimal inter-electrode distance correction amount $\delta d_0$ in a modulation range of an optical density $\Delta OD$.

FIG. 7 is a graph illustrating a relationship between the optical density $\Delta OD$ and the optimal inter-electrode distance correction amount $\delta d_0$ in a modulation range ($0 \leq \Delta OD \leq 2.0$) of the optical density $\Delta OD$. Assuming a quadratic curve passing through the origin, the optimal inter-electrode distance correction amount $\delta d_0$ is the maximum value $\delta d_{0,MAX}$ ($0 \leq \Delta OD \leq D$)=1.81 μm at the optical density $\Delta OD=1.3$. Further, $\delta d_0$ ($\Delta OD=D$)=1.35 μm at $\Delta OD=2.0$ that is the end of the modulation range of the optical density $\Delta OD$.

As described below, the preferable range of the inter-electrode distance correction amount δd at the position providing the minimum optical density $\Delta OD_{min}$ of the element is between the above two values, and thereby it is possible to suppress the inhomogeneity of transmittance to a small value throughout the modulation range of the optical density ΔOD.

Thus, in the EC element of the present invention, the inter-electrode distance correction amount δd at the position providing the minimum optical density $\Delta OD_{min}$ satisfies the following equation (e).

$$\delta d \leq \delta d_{0, MAX} (0<\Delta OD<D) \text{ at the position providing} \\ \delta d_0 (\Delta OD=D) \leq \Delta OD_{min} \quad (e)$$

Figure 8:
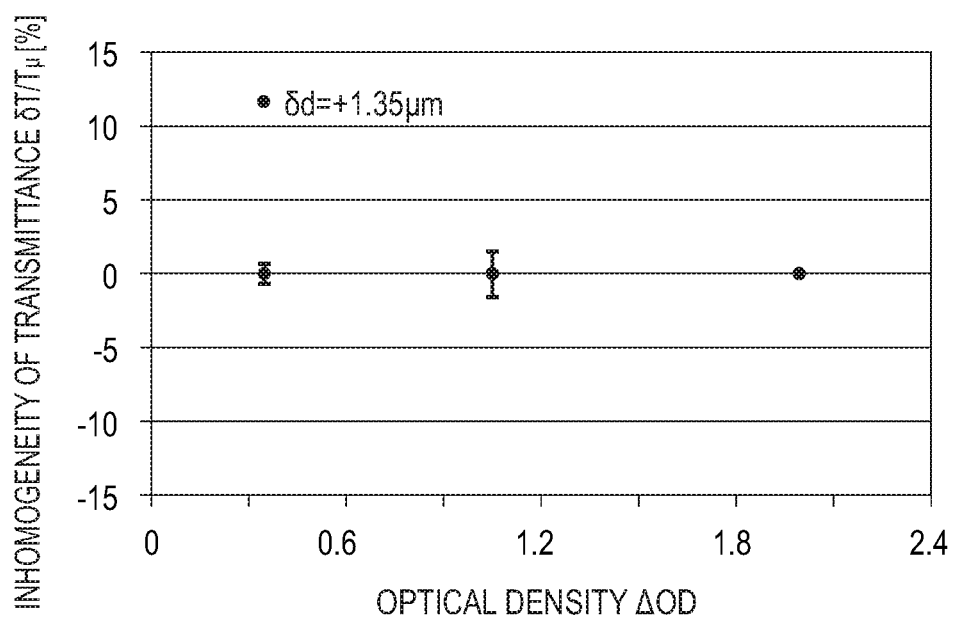
FIG. 8 is a graph illustrating dependency of an optical density of inhomogeneity of transmittance when an inter-electrode distance correction amount δd=1.35 μm is employed.

$\delta d_0 (\Delta OD=D)$: the optimal inter-electrode distance correction amount at $\Delta OD=D$ $\Delta OD_{min}$: the minimum optical density in the coloring region face when the inter-electrode distance is constant δd: an inter-electrode distance correction amount $\delta d_{0, MAX} (0<\Delta OD<D)$: the maximum value of the optimal inter-electrode distance correction amount at $0<\Delta OD<D$ (1) Case of inter-electrode distance correction amount δd=1.35 μm An example in which an element is fabricated by employing the optimal inter-electrode distance correction amount $\delta d_0=1.35$ μm at the maximum value ΔOD=2.0 (end of the modulation range) in the modulation range (0≤ΔOD≤2.0) of the optical density ΔOD is provided. FIG. 8 illustrates optical density dependency of the inhomogeneity of transmittance at a position providing the minimum optical density $\Delta OD_{min}$ at this time. The inhomogeneity of transmittance on the lower density (ΔOD=0.3) side and the inhomogeneity of transmittance on the higher density (ΔOD=2.0) side are suppressed to a small value, and the inhomogeneity of transmittance at the intermediate density (ΔOD=1.0) is relatively larger but is around ±1.5% as the absolute value and is significantly small. Further, on the lower density (ΔOD=0.3) side, the density gradient reverses due to excess correction (see FIG. 6A) but is less than 1% as the absolute value and is not notable. This is a correction specification having good balance in the whole optical density modulation range.

(2) Case of inter-electrode distance correction amount δd=1.73 μm

Figure 9:
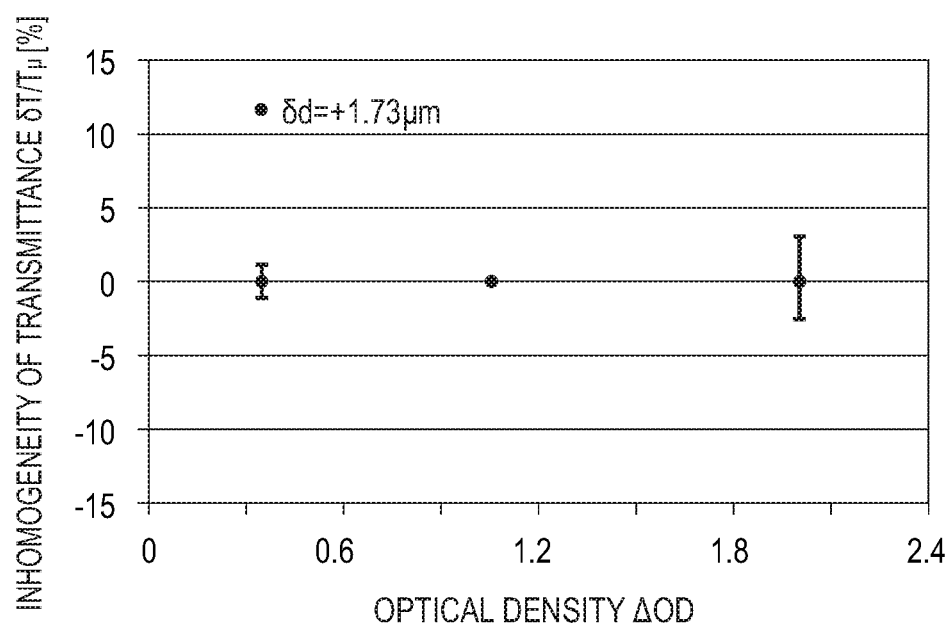
FIG. 9 is a graph illustrating dependency of an optical density of inhomogeneity of transmittance when an inter-electrode distance correction amount δd=1.73 µm is employed.

An example in which an element is fabricated by employing the optimal inter-electrode distance correction amount $\delta d_0=1.73$ μm at the intermediate value ΔOD=1.0 in the modulation range (0≤ΔOD≤2.0) of the optical density ΔOD is provided. FIG. 9 illustrates optical density dependency of the inhomogeneity of transmittance at a position providing the minimum optical density $\Delta OD_{min}$ at this time. The inhomogeneity of transmittance is suppressed to a small value from the lower density (ΔOD=0.3) side to the intermediate density (ΔOD=1.0), and the inhomogeneity of transmittance on the higher density (ΔOD=2.0) side is relatively larger but is around ±2% as the absolute value and is significantly small. This correction specification is preferable for frequent use in the intermediate density region.

(3) Case of inter-electrode distance correction amount δd=1.50 μm

Figure 10:
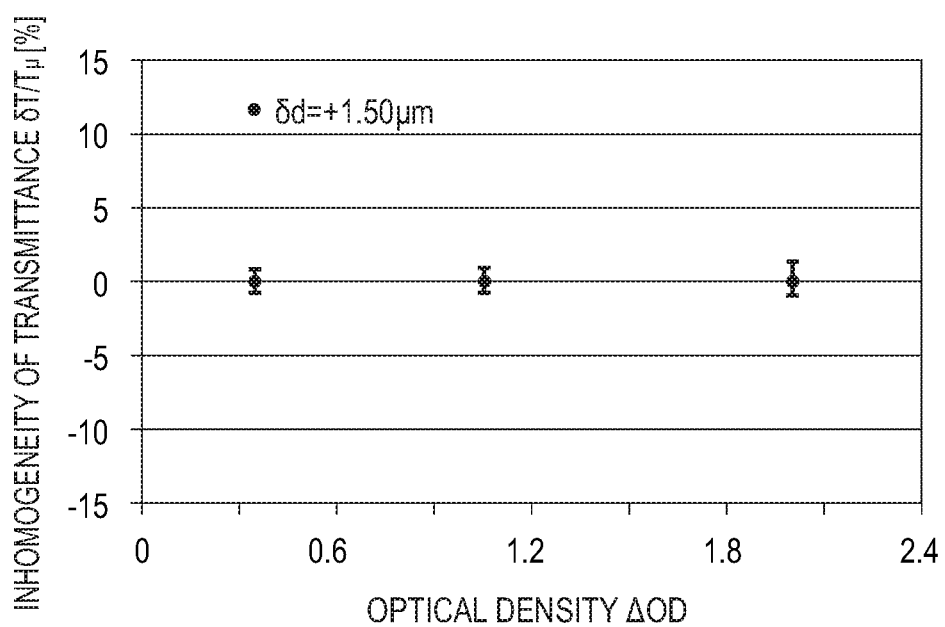
FIG. 10 is a graph illustrating dependency of an optical density of inhomogeneity of transmittance when an inter-electrode distance correction amount δd=1.50 µm is employed.

An example in which an element is fabricated by employing the optimal inter-electrode distance correction amount $\delta d_0=1.50$ μm at the intermediate values ΔOD=0.8 and 1.8 in the modulation range (0≤ΔOD≤2.0) of the optical density ΔOD is provided. FIG. 10 illustrates optical density dependency of the inhomogeneity of transmittance at a position providing the minimum optical density $\Delta OD_{min}$ at this time. Excess correction occurs (see FIG. 6A and FIG. 6C) on the lower density (ΔOD=0.3) side and the higher density (ΔOD=2.0) side, and optical density gradient reverses. However, the absolute values of the inhomogeneity of transmittance are around ±0.8% and around ±1.1%, respectively, and the maximum density difference is less than 1/32 steps, which is in a range where visual recognition is not possible. Further, at the intermediate density (ΔOD=1.0), the absolute value of the inhomogeneity of transmittance is around ±0.9% and is significantly small.

(4) Case of inter-electrode distance correction amount δd=0.84 μm

Figure 11:
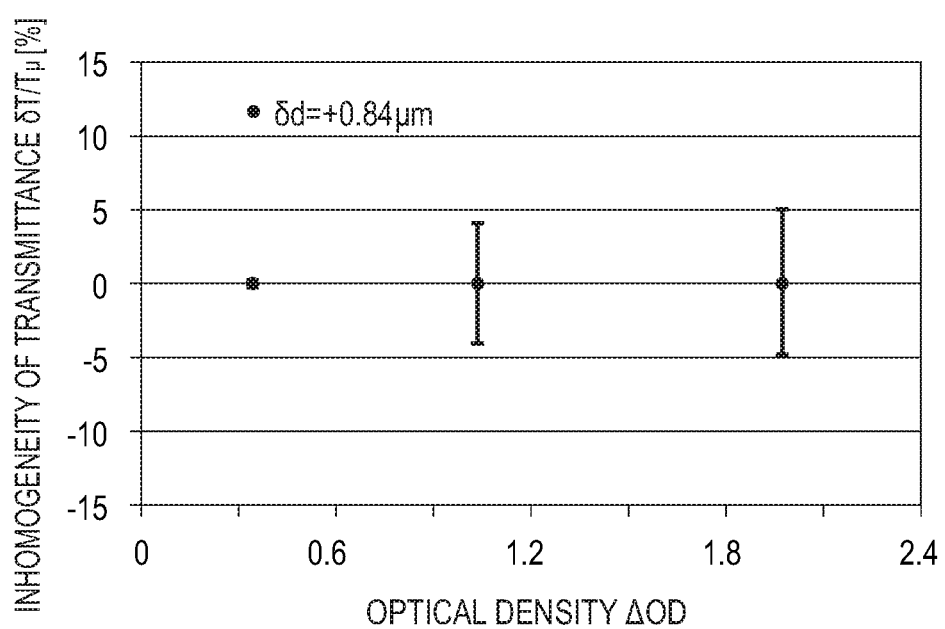
FIG. 11 is a graph illustrating dependency of an optical density of inhomogeneity of transmittance when an inter-electrode distance correction amount δd=0.84 µm is employed.

An example in which an element is fabricated by employing the optimal inter-electrode distance correction amount $\delta d_0=0.84$ μm at the intermediate values ΔOD=0.3 in the modulation range (0≤ΔOD≤2.0) of the optical density ΔOD is provided. The optimal inter-electrode distance correction amount $\delta d_0=0.84$ μm is smaller than the optimal inter-electrode distance correction amount $\delta d_0=1.35$ μm at the end of the optical density modulation range (ΔOD=2.0). FIG. 11 illustrates optical density dependency of the inhomogeneity of transmittance at a position providing the minimum optical density $\Delta OD_{min}$ at this time. Since correction is insufficient in the whole modulation range of the optical density ΔOD, the inhomogeneity of transmittance on the lower density (ΔOD=0.3) side is sufficiently small. However, the inhomogeneity of transmittance is slightly large from the intermediate density (ΔOD=1.0) to the higher density (ΔOD=2.0) side and is around ±5% as the absolute value. Since this corresponds to an exposure difference of around 1/8 steps and a brightness change is visible, it is not suitable for a use in a variable ND filter of an imaging device.

(5) Case of inter-electrode distance correction amount δd=2.02 μm

Figure 12:
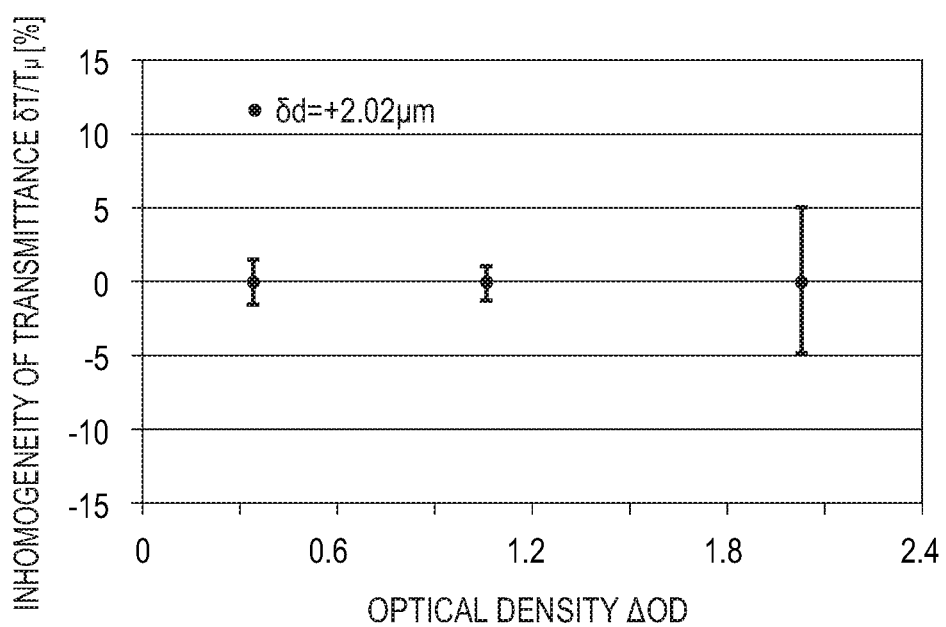
FIG. 12 is a graph illustrating dependency of an optical density of an inhomogeneity of transmittance when an inter-electrode distance correction amount δd=2.02 µm is employed.

An example in which an element is fabricated by employing the inter-electrode distance correction amount δd=2.02 μm that is larger than the maximum value $\delta d_{0, MAX}=1.81$ μm of the optimal inter-electrode distance correction amount $\delta d_0$ in the modulation range (0≤ΔOD≤2.0) of the optical density ΔOD is provided. FIG. 12 illustrates optical density dependency of the inhomogeneity of transmittance at a position providing the minimum optical density $\Delta OD_{min}$ at this time. Excess correction occurs in the whole modulation range of the optical density ΔOD (see FIG. 6A, FIG. 6B and FIG. 6C), and the inhomogeneity of transmittance at the intermediate density (ΔOD=1.0) is around ±1.1% and is sufficiently small. However, the inhomogeneity of transmittance is slightly large on the higher density (ΔOD=2.0) side and is around ±5% as the absolute value. As with "(4) Case of inter-electrode distance correction amount δd=0.84 μm", this is not suitable for a use in a variable ND filter of an imaging device.

As described above, when the inter-electrode distance correction amount δd at the position providing the minimum optical density $\Delta OD_{min}$ satisfies the above equation (e), an excellent correction specification having a good balance in the whole optical density modulation range and a significantly small absolute value of the inhomogeneity of transmittance is obtained.

Herein, although it is preferable that the optical density gradient in the radius direction of the element (the direction from the center point toward to the edge) does not reverse, reverse of the optical density gradient may be allowed in a range where no substantial recognition is possible. It is assumed that the reference of brightness that is difficult for a human to recognize is 1/16 steps, preferable application is possible when the maximum density difference in the coloring region face is smaller than or equal to (log2)/16, preferably, the optical density difference is smaller than or equal to (log2)/16 between any regions in the coloring region face.

Further, the inter-electrode distance in a region between a position providing the maximum optical density $\Delta OD_{max}$ and a position providing the minimum optical density $\Delta OD_{min}$ may be larger than or equal to the inter-electrode distance at the position providing the maximum optical density $\Delta OD_{max}$ and may be smaller than or equal to the inter-electrode distance at the position providing the minimum optical density $\Delta OD_{min}$.

The inter-electrode distance in a region between a position providing the maximum optical density $\Delta OD_{max}$ and a position providing the minimum optical density $\Delta OD_{min}$ may be a value on a catenary where the inter-electrode distance at the position providing the maximum optical density $\Delta OD_{max}$ corresponds to both ends and the inter-electrode distance at a position providing the minimum optical density $\Delta OD_{min}$ corresponds to an apex.

The coloring region face has a rectangular shape, and the position providing the maximum optical density $\Delta OD_{max}$ may include four corners of the coloring region face, and the position providing the minimum optical density $\Delta OD_{min}$ may include the center of the coloring region face.

1.1 Member Forming EC Element

The EC element 5 of the present embodiment has the pair of substrates 1a and 1b, the pair of electrodes 2a and 2b, and the EC layer 4 arranged between the pair of electrodes 2a and 2b. The pair of electrodes 2a and 2b are attached to each other by a seal 3, and the EC layer 4 having an EC compound is arranged in a space defined by the pair of electrodes 2a and 2b and the seal 3. Members forming the EC element 5 will be described below in detail.

1.1.1 Electrochromic Layer (EC Layer) 4

The EC layer 4 may be a solid layer formed by a deposition method or the like or may be a solution layer in which an EC compound is dissolved in an electrolyte solution. A method for forming the EC layer 4 may be a method in which a liquid containing a pre-prepared EC compound by a vacuum injection method, an atmospheric injection method, a meniscus method, or the like is injected into a gap provided between the pair of electrodes 2a and 2b.

The EC compound may be an organic compound or an inorganic compound, or may be an anodic compound that is colored by oxidation reaction from a transparent state or a cathodic compound that is colored by reduction reaction from a transparent state. Further, both an anodic compound and a cathodic compound may be used. In particular, when an organic compound is used, it is preferable that both an anodic organic compound and a cathodic organic compound be used because coloring efficiency for current is higher. In this specification, an element having both an anodic compound and a cathodic compound is referred to as a complementary EC element, and an element having any one of an anodic compound and a cathodic compound is referred to as a unipolar EC element. The anodic compound is also referred to as an anode material, and the cathodic compound is also referred to as a cathode material.

When a complementary EC element is driven, electrons are extracted from the EC compound by oxidation reaction in one electrode, and an EC compound receives the electrons by reduction reaction in the other electrode. A radical cation may be generated from a neutral molecule by oxidation reaction. Further, a radical anion may be generated from a neutral molecule by reduction reaction, or a radical cation may be generated from a dication molecule by reduction reaction. Since the EC compound is colored in both of the pair of electrodes 2a and 2b, a complementary EC element is preferably used when a large change in the optical density is required at the time of coloring. On the other hand, a unipolar EC element is preferably used because power consumption of the unipolar EC element can be suppressed compared to power consumption of the complementary EC element. This is because the complementary EC element has a self-erasing reaction in which the colored anodic compound and the colored cathodic compound exchange electrons, and a large current is required for maintaining a coloring state.

When the EC compound is an inorganic compound, an electrolyte layer may be provided between the EC layer 4 and at least one of the pair of electrodes 2a and 2b. On the other hand, when the EC compound is an organic compound, an electrolyte layer may be provided as with the case of an inorganic compound, or an electrolyte solution may be provided with an organic compound.

The organic EC compound may be a conductive polymer such as polythiophene or polyaniline, an organic low-molecular compound such as a viologen-based compound, an anthraquinone-based compound, an oligothiophene derivative, a phenazine derivative, or the like. The inorganic EC compound may be a metallic oxide material such as $NiO_x$ or $WO_3$.

The EC layer 4 may have a stacked configuration of an electrolyte layer including an electrolyte and a layer including an EC compound. The EC layer 4 may have only the single type of EC compound or may have multiple types of EC compounds. When the EC layer 4 includes multiple types of EC compounds, it is preferable that the difference in the oxidation-reduction potential of the EC compound be small. When the EC layer 4 has multiple types of EC compounds, the EC layer 4 may have four or more types of EC compounds including an anodic compound and a cathodic compound. The EC element of the present invention may have five or more types of EC compounds. When the EC layer 4 has multiple types of EC compounds, the oxidation-reduction potential of a plurality of anode materials may be within 60 mV, and the oxidation-reduction potential of a plurality of cathode materials may be within 60 mV. When the EC layer 4 has multiple types of EC compounds, the multiple types of EC compounds may include a compound having an absorption peak that is higher than or equal to 400 nm and lower than or equal to 500 nm, a compound having an absorption peak that is higher than or equal to 500 nm and lower than or equal to 650 nm, and a compound having an absorption peak that is higher than or equal to 650 nm. The absorption peak means that the full width half maximum is larger than or equal to 20 nm. Further, a state of a material when light is absorbed may be an oxidation state, a reduction state, or a neutral state.

An electrolyte is not limited as long as it is an ionic dissociable salt and has a good solubility for a solvent or high compatibility in a solid electrolyte. Specifically, an electrolyte having electron donating is preferable. These electrolytes may be referred to as a supporting electrolyte. An electrolyte may be, for example, inorganic ion salts such as various alkali metal salts, or alkaline earth metal salts, quaternary ammonium salts, cyclic quaternary ammonium salts, or the like. Specifically, an alkali metal salt of Li, Na, or K such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$, or $KCl$, a quaternary ammonium salt such as $(CH_3)_4NBF_4$, $(C_2H_5)_4NBF_4$, $(n-C_4H_9)_4NBF_4$, $(n-C_4H_9)_4NPF_6$, $(C_2H_5)_4NBr$, $(C_2H_5)_4NClO_4$, or $(n-C_4H_9)_4NClO_4$, a cyclic quaternary ammonium salt, or the like may be used.

As a solvent used for dissolving an EC compound and an electrolyte, while the solvent is not particularly limited as long as it can dissolve an EC compound or an electrolyte, the polar solvent is preferable in particular. Specifically, water or an organic polar solvent such as methanol, ethanol, propylene carbonate, ethylene carbonate, dimethyl sulfoxide, dimethoxyethane, γ-butyrolactone, γ-valerolactone, sulfolane, dimethylformamide, dimethoxyethane, tetrahydrofuran, acetonitrile, propionnitrile, 3-methoxypropionnitrile, benzonitrile, dimethylacetamide, methylpyrrolidinone, dioxolan, or the like may be used.

The EC layer 4 may further include a polymer matrix or a gelling agent. In such a case, the EC layer 4 is a higher viscous liquid or a gel in some cases. For example, a polymer may be polyacrylonitrile, carboxymethylcellulose, pullulan-based polymer, polyvinyl chloride, polyethylene oxide, polypropylene oxide, polyurethane, polyacrylate, polymethacrylate, polyamide, polyacrylamide, polyester, Nafion (registered trademark), or the like, and PMMA is preferably used.

1.1.2 Substrates 1a and 1b

As the substrates 1a and 1b, a colorless or colored glass, a tempered glass, or the like may be used, for example. As such glass materials, an optical glass substrate such as Corning #7059 or BK-7 may be preferably used. Moreover, as the substrates 1a and 1b, a material having high rigidity and causing less distortion is preferable. Note that, in present embodiment, "transparent" means that the transmittance of visible light is larger than or equal to 50%.

1.1.3 Electrodes 2a and 2b

The electrodes 2a and 2b may be, for example, a metal or metallic oxide such as an indium tin oxide (ITO) alloy, fluorine-doped tin oxide (FTO), tin oxide (NESA), indium zinc oxide (IZO), silver oxide, vanadium oxide, molybdenum oxide, gold, silver, platinum, copper, indium, or chromium, a silicon-based material such as polycrystalline silicon, or amorphous silicon, a carbon material such as carbon black, graphite, or glassy carbon, or the like. Further, a conductive polymer whose conductivity is improved by doping treatment or the like, for example, polyaniline, polypyrrole, polythiophene, polyacetylene, polyparaphenylene, a complex of polyethylenedioxythiophene (PEDOT) and polystyrenesulfonate, or the like are also preferably used.

Since the EC element 5 according to the present invention preferably has a high transmittance in a decolored state, the electrodes 2a and 2b are particularly preferably formed of a transparent material such as ITO, IZO, NESA, PEDOT: PSS, or graphene, for example. These materials can be used in various forms such as bulk or fine particles. Note that each of these electrodes may be used alone, or a plurality of these electrodes may be used in combination.

1.1.4 Seal 3

As the seal 3, a material that is chemically stable, does not permeate a gas or a liquid, and does not inhibit oxidation-reduction reaction of the EC compound is preferable. The seal 3 may be, for example, an inorganic material such as a glass frit, an organic material such as an epoxy resin, a metal material, or the like.

1.1.5 Spacer

The EC element 5 according to the present invention may have a spacer. The spacer has a function of defining the distance between the electrodes 2a and 2b. The seal 3 may have the function of the spacer. The spacer may be formed of an inorganic material such as silica beads, or a glass fiber or an organic material such as polydivinylbenzene, polyimide, polytetrafluoroethylene, fluororubber, or an epoxy resin.

2. Use of EC Element

By driving the EC element according to the present embodiment, the EC element can adjust the amount of a light passing through the EC element and can be used for an optical filter such as a variable ND filter, a lens unit, an imaging device, or the like.

2.1 Optical Filter

An optical filter of the present invention has the EC element of the present invention and an active element connected to the EC element. The optical filter of the present invention may include a peripheral device. The active element may be directly connected to the EC element or may be indirectly connected via other elements. The active element may be a TFT element, a MIM element, or the like, for example. The optical filter of the present invention adjusts the light amount of a light passing through the EC element by an active element driving the EC element. The optical filter of the present invention may be used for an imaging device such as a camera. When used for an imaging device, the optical filter may be provided in an imaging device body or may be provided in a lens unit.

2.2 Lens Unit and Imaging Device

The lens unit of the present invention has an optical filter of the present invention described above and an imaging optical system having a plurality of lenses. The lens unit of the present invention may be arranged so that a light that has passed through the optical filter of the present invention passes through the imaging optical system or may be arranged so that a light that has passed through the imaging optical system passes through the optical filter of the present invention.

Further, the imaging device of the present invention has the optical filter of the present invention and the image pickup device that receives a light that has passed through the optical filter.

Figure 13A:
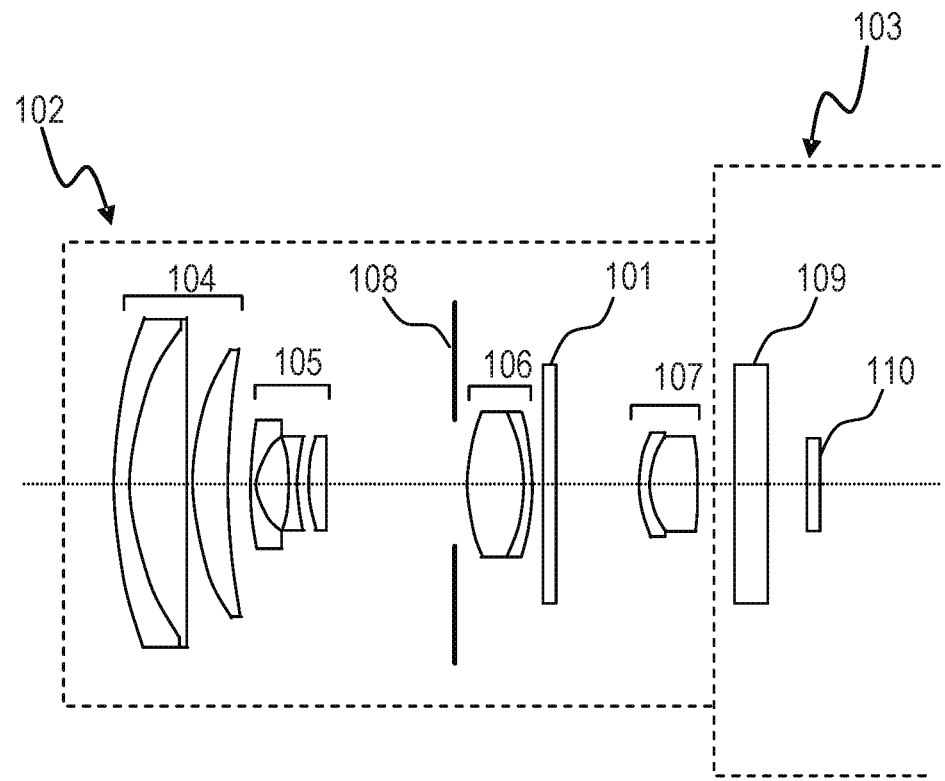
FIG. 13A is a schematic diagram illustrating one embodiment of an imaging device having a lens unit with an optical filter of the present disclosure.
Figure 13B:
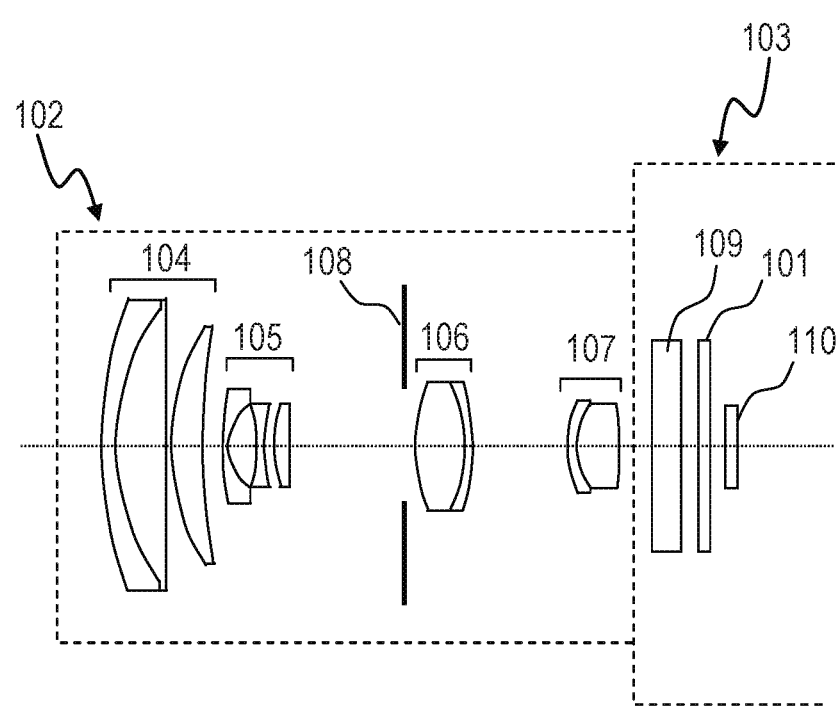
FIG. 13B is a schematic diagram illustrating another embodiment of an imaging device having an optical filter of the present disclosure.

FIG. 13A is a schematic diagram illustrating an imaging device using the optical filter of the present invention and illustrates an imaging device having a lens unit 102 using an optical filter 101 of the present invention, and FIG. 13B illustrates an imaging device having the optical filter 101 of the present invention. As illustrated in FIG. 13A and FIG. 13B, the lens unit 102 is connected in a removable manner to an imaging unit 103 via a mount member (not illustrated).

The lens unit 102 is a unit having a plurality of lenses or lens groups. For example, in FIG. 13A, the lens unit 102 represents a zoom lens of a rear focus scheme that performs focusing on the post-stage of an aperture. The lens unit 102 has four lens groups: a first lens group 104 of positive refractive power, a second lens group 105 of negative refractive power, a third lens group 106 of positive refractive power, and a fourth lens group 107 of positive refractive power in this order from the object side (the left side to the sheet). The magnification is changed by changing the gap between the second lens group 105 and the third lens group 106, and focusing is performed by moving some of the lens of the fourth lens group 107. For example, the lens unit 102 has an aperture 108 between the second lens group 105 and the third lens group 106 and has the optical filter 101 of the present invention between the third lens group 106 and the fourth lens group 107. The arrangement is such that a light passing through the lens unit 102 passes through each of the lens groups 104 to 107, the aperture 108, and the optical filter 101 of the present invention, and a light amount can be adjusted by using the aperture 108 and the optical filter 101 of the present invention.

Further, the configuration inside the lens unit 102 can be changed as appropriate. For example, the optical filter 101 of the present invention can be arranged in front of the aperture 108 (on the object side) or behind the aperture 108 (on the imaging unit 103 side), and may be arranged in front of the first lens group 104 or may be arranged behind the fourth lens group 107. With the optical filter 101 of the present invention being arranged at a position where a light converges, there is an advantage of the reduced area of the optical filter 101 of the present invention or the like. Further, the form of the lens unit 102 can be selected as appropriate, which may be an inner focus scheme that performs focusing in front of the aperture or other schemes instead of the rear focus scheme. Further, a special lens such as a fisheye lens, a macro-lens, or the like instead of the zoom lens can be selected as appropriate.

A glass block 109 in the imaging unit 103 is a glass block such as a low-pass filter, a phase plate, a color filter, or the like. Further, the image pickup device 110 is a sensor unit that receives a light that has passed through the lens unit 102, and a CCD, a CMOS, or the like can be used. Further, the image pickup device 110 may be an optical sensor such as a photodiode, and an element that acquires and outputs information on the intensity or the wavelength of a light can be used as appropriate.

As illustrated in FIG. 13A, when the optical filter 101 of the present invention is embedded in the lens unit 102, a drive unit may be arranged inside the lens unit 102, for example, may be arranged outside the lens unit 102, such as inside the imaging unit 103. When the drive unit is arranged outside the lens unit 102, the EC element and the drive unit inside and outside the lens unit 102 are connected via a wiring for drive control.

As illustrated in FIG. 13B, the imaging unit 103 may have the optical filter 101 of the present invention. The optical filter 101 of the present invention may be arranged at a suitable part inside the imaging unit 103, and the image pickup device 110 is arranged so as to receive a light that has passed through the optical filter 101 of the present invention. In FIG. 13B, the optical filter 101 of the present invention is arranged closely in front of the image pickup device 110, for example. When the optical filter 101 of the present invention is built in the imaging unit 103, since the connected lens unit 102 is not required to have the optical filter 101 of the present invention, it is possible to configure a dimmable imaging device using an existing lens unit.

Such an imaging device is applicable to a product having a combination of a light amount adjustment function and an image pickup device. For example, the imaging device can also be used in a camera, a digital camera, a video camera, or a digital video camera and can be applied to a product such as a mobile phone or a smartphone, a PC, a tablet, or the like which the imaging device is built in.

By using the optical filter 101 of the present invention as a dimming member, it is possible to appropriately change a dimming amount by a single filter, and there is an advantage of the reduced number of components or space-saving.

2.3 Window Member

Figure 14A:
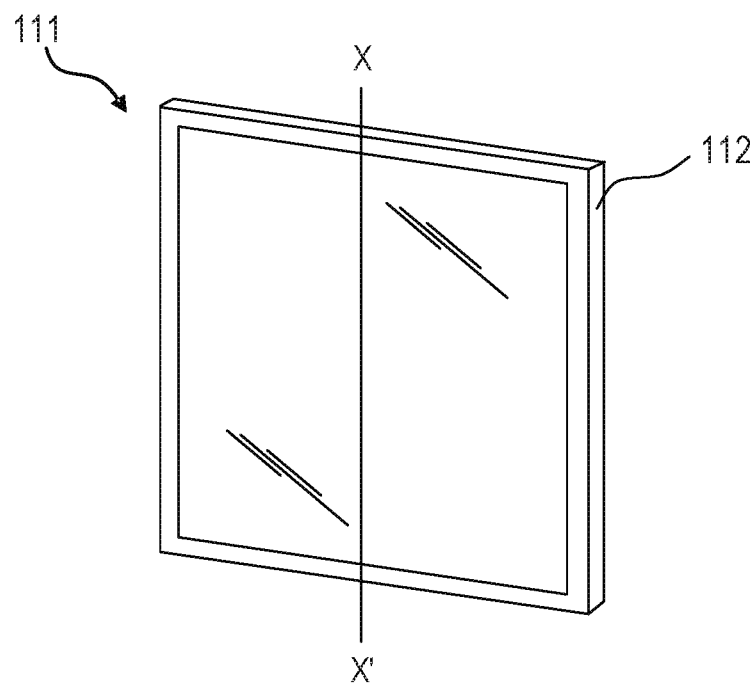
FIG. 14A is a schematic diagram illustrating an example of one embodiment of a window member (perspective view) of the present disclosure.
Figure 14B:
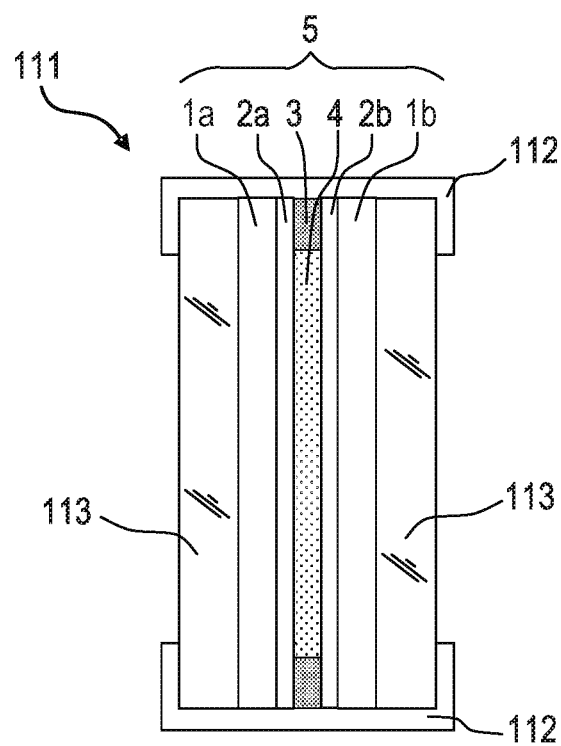
FIG. 14B is a schematic diagram illustrating an example of one embodiment of a window member (sectional view) of the present disclosure.

The window member of the present invention has the EC element 5 of the present invention. The window member of the present invention preferably has a driving unit that drives the EC element 5. FIG. 14A and FIG. 14B are diagrams illustrating the window member of the present invention.

FIG. 14A is a perspective view, and FIG. 14B is a sectional view taken along a line X-X' of FIG. 14A.

A window member 111 illustrated in FIG. 14A and FIG. 14B is a dimming window and is formed of the EC element 5, transparent plates 113 interposing the EC element, and a frame 112 surrounding and integrating the entirety. The driving unit may be integrated inside the frame 112 or may be arranged outside the frame 112 and connected to the EC element 5 through a wiring. The transparent plate 113 is not particularly limited as long as it is a material having a high light transmittance and is preferably a glass material when a use as a window is considered. While the EC element 5 is a separate component from the transparent plates 113 in FIG. 14A and FIG. 14B, the substrates 1a and 1b of the EC element 5 may be the transparent plates 113, for example. Any material may be used for the frame 112, and a general member that covers at least a part of the EC element 5 and has an integrated form can be a frame.

Such a dimming window can be applied to a use to adjust the incidence amount of the sunlight in daytime into a room, for example. Such dimming window can also be applied to adjustment of a heat amount as well as a light amount of the sun and thus can be used for control of the brightness or the temperature inside a room. Further, such a dimming window is applicable to a use to block a view from the outside of a room to the inside of the room as a shutter. Such a dimming window is applicable not only to a glass window for a building but also to a window of a vehicle such as an automobile, a train, an airplane, a ship, or the like or a filter on the display face of a watch or a mobile phone.

According to the EC element of the present disclosure, it is possible to provide an EC element in which inhomogeneity of transmittance is reduced by control of an optical path length in an element sectional direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-048245, filed Mar. 15, 2019, which is hereby incorporated by reference herein in its entirety.

What is claimed is:

1. An electrochromic element comprising:

a pair of electrodes; and an electrochromic layer arranged between the pair of electrodes, wherein the electrochromic element has a modulation range of an optical density $\Delta OD$ that is $0 \leq \Delta OD \leq D$, and wherein when a maximum optical density and a minimum optical density in a coloring region face when an inter-electrode distance of the pair of electrodes is constant are $\Delta OD_{max}$ and $\Delta OD_{min}$, respectively, an inter-electrode distance $d'$ of the pair of electrodes is represented by a following equation at a position providing the minimum optical density $\Delta OD_{min}$:

$$d' = d + \delta d$$

d: an inter-electrode distance when the inter-electrode distance of the pair of electrodes is constant $\delta d$: an inter-electrode distance correction amount D: a constant which is 2 or less $\Delta OD$: an optical density according to a point of the electrochromic element, and when an optimal inter-electrode distance correction amount $\delta d_0$ calculated when an optical density difference between the maximum optical density $\Delta OD_{max}$ and the minimum optical density $\Delta OD_{min}$ is completely eliminated at the position providing the minimum optical density $\Delta OD_{min}$ is defined as a following equation:

$$\delta d_0 (\Delta OD) = d \times (\Delta OD_{max}/\Delta OD_{min} - 1),$$

the inter-electrode distance correction amount $\delta d$ at the position providing the minimum optical density $\Delta OD_{min}$ is smaller than or equal to a maximum value $\delta d_{0,\ MAX}$ of the optimal inter-electrode distance correction amount $\delta d_0$ ($0 < \Delta OD < D$) at $0 < \Delta OD < D$ and larger than or equal to the optimal inter-electrode distance correction amount $\delta d_0$ ($\Delta OD = D$) at $\Delta OD = D$.

2. The electrochromic element according to claim 1, wherein an optical density difference of the electrochromic element is less than or equal to $(\log 2)/16$ between any regions in the coloring region face.

3. The electrochromic element according to claim 1, wherein an inter-electrode distance d' of the pair of electrodes in a region between a position providing the maximum optical density $\Delta OD_{max}$ and the position providing the minimum optical density $\Delta OD_{min}$ in the coloring region face is larger than or equal to an inter-electrode distance at the position providing the maximum optical density $\Delta OD_{max}$ and is smaller than or equal to an inter-electrode distance at the position providing the minimum optical density $\Delta OD_{min}$.

4. The electrochromic element according to claim 1, wherein an inter-electrode distance d' of the pair of electrodes in a region between the position providing the maximum optical density $\Delta OD_{max}$ and the position providing the minimum optical density $\Delta OD_{max}$ in the coloring region face is a value on a catenary on which both ends correspond to the inter-electrode distance at the position providing the maximum optical density $\Delta OD_{max}$ and an apex corresponds to the inter-electrode distance at the position providing the minimum optical density $\Delta OD_{min}$.

5. The electrochromic element according to claim 1, wherein the coloring region face has a rectangular shape, and the position providing the maximum optical density $\Delta OD_{max}$ includes four corners of the coloring region face, and the position providing the minimum optical density $\Delta OD_{min}$ includes the center of the coloring region face.

6. An optical filter comprising:
the electrochromic element according to claim 1; and
an active element connected to the electrochromic element.

7. The optical filter according to claim 6, wherein the active element adjusts a light amount of a light passing through the electrochromic element by driving the electrochromic element.

8. A lens unit comprising:
an imaging optical system having a plurality of lenses; and
the optical filter according to claim 6.

9. An imaging device comprising:
the optical filter according to claim 6; and
an image pickup device that receives a light that has passed through the optical filter.

10. A window member comprising the electrochromic element according to claim 1.

* * * * *